United States Patent Office 3,149,154
Patented Sept. 15, 1964

3,149,154
PROCESS FOR PREPARING UNSYMMETRICAL
N,N'-DISUBSTITUTED ETHYLENEDIAMINES
Edward Fuller Cluff and Herbert F. McShane, Jr., Wilmington, Del., assignors to E. I. du Pont de Nemours and Company, Wilmington, Del., a corporation of Delaware
No Drawing. Filed Aug. 28, 1959, Ser. No. 836,578
1 Claim. (Cl. 260—534)

This invention is directed to a new process for preparing unsymmetrical N,N'-dialkyl ethylene diamines which may contain ethylenic unsaturation and may be substituted by alkoxy, aryloxyl, carboxyl, hydroxyl, or mercapto groups or by halogen atoms. These compounds are useful for preparing polyurethane condensation polymers which can be made into films, coatings, and elastomers possessing improved heat stability. The ethylenically unsaturated or hydroxyl-substituted diamines made by the present invention are particularly useful because they also provide side-chain cure sites when they are incorporated into the polymers backbone.

Intermediates have been needed for polyurethane polymers containing nitrogen atoms which are entirely tertiary. Although conventional polyurethane polymers containing secondary urea and urethane nitrogen atoms have exhibited exceptional abrasion resistance, their thermal stability has usually not been entirely satisfactory at high temperatures; all the factors underlying this deficiency have not been clearly determined; it is generally believed, however, that at certain groupings along the polymer chains cleavage occurs through a shift of hydrogen atoms attached to nitrogen with subsequent regeneration of isocyanate groups.

Both urea and urethane bridges containing a nitrogen atom to which a hydrogen atom is attached may undergo a temperature-dependent dissociation as follows:

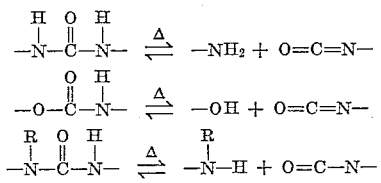

If the urea and urethane nitrogen atoms are entirely tertiary, the dissociation shown by the above equations cannot occur and the thermal stability of the polymer is, accordingly, enhanced. The reaction of bis(chloroformates) with secondary amines leads to the formation of heat stable N-alkyl substituted urethane bridges:

Elastomeric polyurethane condensation products have been cured in the past by compounding them with polyisocyanates and subsequently heating under pressure, usually in molds, to cure. Unfortunately, such compounded stocks have been troubled by a problem called "bin scorch." They are sensitive to moisture and cannot be allowed to stand indefinitely before curing. It is thought that the isocyanate groups present react with the water absorbed in the polymer stock to form ureas; the amount of isocyanate available for the desired cross-linking process is, consequently, decreased and the subsequent cure is less satisfactory. It would, therefore, be highly desirable to employ a curing method, such as vulcanization by sulfur, which is not sensitive to the presence of trace amounts of water. Polyurethane intermediates are needed which can contribute ethylenically unsaturated side chains to act as cure sites for sulfur curing.

It is an object of the present invention to provide a novel process for making unsymmertical N,N'-dialkyl-ethylenediamines. Another object is to provide intermediates for the synthesis of polyurethane polymers with improved heat stability. It is a further object to provide intermediate for the synthesis of polyurethane elastomers which have sulfur curable ethylenic unsaturation. Still further an object of the present invention is to provide intermediates for the synthesis of polyurethane elastomers which do not suffer for bin scorch.

These and other object will become apparent in the following description and claim.

More specifically, the present invention is directed to a novel process for making ethylene diamines of the formula

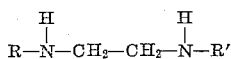

where R and R' are dissimilar organic radicals taken from the group consisting of unsubstituted alicyclic and acyclic hydrocarbons, and, alicyclic and acyclic hydrocarbons wherein R and R' are singularly and collectively substituted by a radical taken from the group consisting of alkoxyl radicals, alkenoxyl radicals, aryloxyl radicals, phenyl radicals, halogen atoms, hydroxyl radicals, carboxyl radicals and mercapto radicals; and, R and R' are attached to the respective nitrogen atoms by means of a carbon atom taken from the group consisting of alicyclic and acyclic carbon atoms. Either R or R' or both may contain ethylenic unsaturation. Preferably, R is alkyl, alkenyl of from 1 to 8 carbon atoms or such groups substituted by a radical of the group listed above having no more than six carbon atoms.

These unsymmetrical N,N'-dialkyl ethylene diamines are prepared according to the present invention by alkylating an N-alkyl ethylene diamine in the form of its piperazine-2,3-dione derivative. The subject process comprises: (1) heating approximately equimolar amounts of an N-alkyl substituted ethylenediamine with a di-lower alkyl oxalate at 180–220° C. to get the N-alkyl piperazine-2,3-dione; (2) reacting approximately equimolar amounts of the N-alkyl piperazine-2,3-dione with an alkali metal base selected from the group consisting of Group IA metal alkoxides and Group IA metal hydrides in an inert polar solvent to form a salt at the N'-position of said N-alkyl piperazine-2,3-dione: (3) reacting this salt in an inert polar solvent with at least a molar equivalent of an alkyl halide to form the unsymmetrical N,N'-dialkyl piperazine-2,3-dione; said alkyl halide having the formula

where R is an alkyl radical selected from the group consisting of alkyl radicals, alkyl radicals having at least one substituent selected from the group consisting of alkoxyl, aryloxyl, hydroxyl, 2-(methylcarbonylthio)ethyl, and fluoro radicals, cycloalkyl radicals, and cycloalkyl radicals having at least one substitutent selected from the group consisting of alkoxyl, aryloxyl, hydroxyl, 2-(methylcarbonylthio)ethyl, and fluoro radicals; R' is a radical selected from the group consisting of hydrogen and R radicals; X is halogen atom selected from the group consisting of chlorine, bromine, and iodine; with the proviso that R may contain ethylenic unsaturation, and with the further proviso that R may be substituted by chlorine unless X is a chlorine atom; (4) recovering said unsymmetrical N,N'-dialkyl piperazine-2,3-dione; (5) heating this disubstituted piperazine2,3-dione with an aqueous alcoholic solution of an alkali metal hydroxide and recovering the unsymmetrical N,N'-dialkyl ethylene diamine thereby liberated.

The reaction of N-alkyl substituted ethylenediamine compounds with dimethyl oxalate may be carried out by a procedure similar to the disclosed by J. L. Riebsomer [J. Org. Chem. 15, 68 (1950)]. The reaction is initiated by adding the N-alkyl substituted ethylenediamine to approximately a molar equivalent of well-agitated dimethyl oxalate at room temperature. An exchange catalyst such as concentrated hydrochloric acid may be present but it is not essential. Condensation occurs and methanol is evolved. External heat is applied and the temperature of the reaction mass is raised to 220° C. in about an hour. The process of the reaction can be followed by collecting the methanol evolved.

As the temperature is raised toward 180° C. the reaction mass becomes increasingly viscous. Although the exact course of the condensation is not known, it is believed that the formation of the desired n-alkyl piperazine-2,3-dione

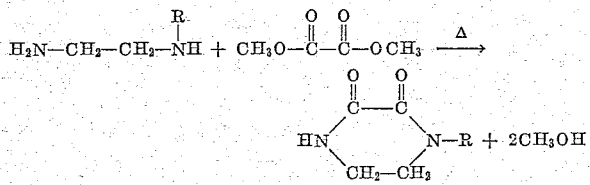

is accompanied by a competitive polymerization reaction

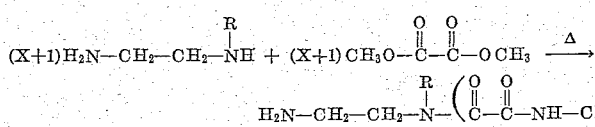

At a temperature of about 180° C., the viscosity of the mass markedly decreases. It is though that polymer breakdown begins to occur at this point. In any case, it is desirable to raise the temperature to about 210–220° C. and maintain it until methanol evolution ceases. If the temperature is allowed to climb to about 240° C. the N-alkyl piperazine-2,3-dione may be damaged by the excessive heat. If the temperature is kept below about 180° C., it is difficult to isolate the crystalline N-alkyl piperazine 2,3-dione later from the viscous product mixture. When the methanol evolution has ceased and the reaction mass has cooled to room temperature, it may be taken up in a suitable solvent (such as ethanol). The N-alkyl piperazine-2,3-dione crystallizes from solution; the filtrate often yields a non-crystallizable colored oil.

The compounds of the present invention are made from N-alkyl substituted ethylenediamines of the formula R'—NH—CH$_2$—CH$_2$—NH$_2$ where R' is an organic radical which is attached to the nitrogen atom by means of acyclic or alicyclic carbon atoms; R may contain ethylenic unsaturation; R may also be substituted by alkoxy radicals, fluorine atoms, and hydroxyl radicals. Representative examples of useful starting amines are: N-methylethylenediamine, N-ethylethylenediamine, N-propylethylene diamine, N-isopropylethylenediamine, N-n-butylethylenediamine, N-isobutylethylenediamine, N-n-amylethylenediamine, N-isoamylethylenediamine, N-sec-amylethylenediamine, N-n-hexylethylenediamine, N-isooctylethylenediamine, N-n octadecylethylenediamine, N-benzylethylenediamine, N-cyclohexylethylenediamine, N-(4-cyclohexylbutyl)ethylenediamine, N-(4-cyclohexyl-3-phenylbutyl)ethylenediamine, N-(2-fluoroethyl)ethylenediamine, N-(2-hydroxyethyl)ethylenediamine, N-(4-hydroxycyclohexyl)-ethylenediamine, N-(2-allyloxyethyl)ethylenediamine, N-[2-(4-pentenyloxy)ethyl]ethylenediamine, N-(4-phenoxybutyl)ethylenediamine, and N-(4-pentenyl)-ethylenediamine.

Esters of oxalic acid such as dimethyloxalate and diethyl oxalate are suitable and preferred. The progress of the condensation reaction can be followed by measuring the amount of alcohol liberated.

It has been discovered that an N-alkyl substituted piperazine-2,3-dione may be alkylated at the unsubstituted nitrogen atom. This permits the preparation of unsymmetrically substituted piperazine-2,3-diones which yield, in turn the unsymmetrically substituted ethylenediamines of the present invention. Alkylation of amides in general is old in the art. Sodium hydride has been used to convert amides to their salts and a variety of simple halides have been employed as alkylating agents [Fones, J. Org. Chem., 14, 1099 (1949)].

The first step in the alkylation of the N-alkyl substituted piperazine-2,3-dione is the preparation of a metal salt. This is carried out by reacting approximately equimolar amounts of the N-alkyl substituted piperazine-2,3-dione and a Group IA metal base or hydride. The preferred method is treatment of this piperazine-2,3-dione in tert-butanol with about a molar equivalent of potassium tert-butoxide

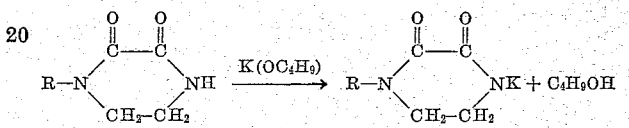

If less than a molar equivalent of potassium tert-butoxide is used, the N-alkyl substituted piperazine-2,3-dione will not be completely changed to the potassium salt; thus in the next step it will not be entirely converted to the dialkyl substituted product desired. If excess potassium tert-butoxide is employed, it may react later with the added alkyl halide R'X to give undesired by-products such as ethers and vinyl compounds R'—CH$_2$CH$_2$X + K(OC$_4$H$_9$)
$\rightarrow$ R'—CH$_2$—CH$_2$—O(C$_4$H$_9$) + KX
R'—CH$_2$—CH$_2$X + K(OC$_4$H$_9$)
$\rightarrow$ R'—CH=CH$_2$ + KX + C$_4$H$_9$OH at the expense of the preferred alkylation of the N-alkyl substituted piperazine-2,3-dione. Furthermore, excess potassium-tert-butoxide may promote attack on alkali sensitive groups in R

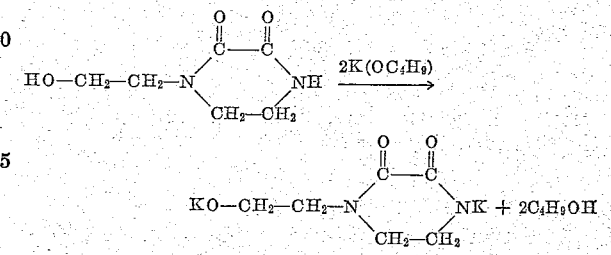

The most convenient method for carrying out the reaction consists in adding potassium metal to tert-butanol and agitating the suspension until all the metal has reacted to yield a solution of potassium tert-butoxide in tert-butanol. Then the N-alkyl piperazine-2,3-dione is introduced and the mixture obtained is agitated at reflux. The potassium salt of the N-alkyl piperazine may precipitate in part.

The useful metal alkoxides are, in general, prepared from tertiary alcohols such as tert-butanol, dimethylethylcarbinol, and diethylisopropylcarbinol. The alkoxide is usually prepared by adding the metal to the alcohol which will later serve as the solvent for the alkylation.

Generally the alkylation of the metal salt of the N-alkyl piperazine-2,3-dione is carried out without prior isolation of the salt. However, the salt may be isolated, if desired. Since the same solvent is usually employed for both the metalation and the alkylation, the solvent must be compatible with the metal base.

The solvents suitable for carrying out the alkylation of the metal salt of the N-alkyl piperazine-2,3-dione must be polar enough to keep at least part of the metal salt in solution during the reaction. It is not necessary that the dialkylated piperazine-2,3-dione be held in solution although this usually happens. In order to conduct the reaction in a convenient length of time, the boiling point of the solvent should preferably be between about 50–100° C. Representative examples of suitable solvents are: 1,4-dioxane, di-n-butyl ether, and t-butanol.

The alkylation of the metal salt of the N-alkyl piperazine-2,3-dione is carried out by agitating approximately equimolar amounts of the metal salt and an halide R'X at or near the reflux temperature of the mixture. The metal halide MX which is formed

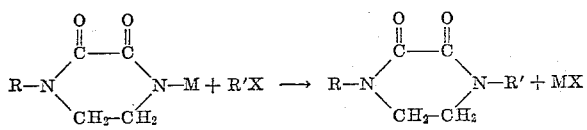

generally precipitates from solution.

The halide R'X may be primary or secondary. The former is preferred. Employment of tertiary alkyl halides is not recommended. R' itself is an acyclic or cyclic aliphatic radical which may contain ethylenic unsaturation and may be substituted by alkoxyl, arloxyl, hydroxyl radicals, and 2-(methylcarbonylthio)ethyl-radical and fluorine atoms. The R' radical is preferably an alkyl or alkenyl group of from 1 to 18 carbon atoms or such a group substituted by a radical selected from the group consisting of alkoxyl, alkenoxyl, aryloxyl, phenyl, hydroxyl, carboxyl, mercapto and halogen having no more than six carbon atoms. If the halogen X is bromine or iodine, R' may also be substituted by chlorine. Representative examples of useful halides are: 2-bromopropane, 1-bromohexane, cyclohexylbromide, 1-bromo-4-chlorobutane, 5-bromo-1-pentene, 1-bromo-5-allyloxy-pentane, 1-chloro-6-allyloxylhexane, 6-chloro-3-phenyl-1-hexene, 1-bromo-7-cyclohexoxyheptane, 3-(bromomethyl)cyclohexene, 1-chloro-3-hydroxymethyl)-butane, 2-bromoethylthioacetate, and ethyl bromoacetate. When the agent is 2-bromoethylthioacetate the hydrolysis of the piperazine-2,3-dione gives an N'(2-mercaptoethyl) substituted ethylenediamine. When the agent is ethyl bromoacetate the hydrolysis of the piperazine-2,3-dione gives an N'-carboxymethyl substituted ethylene diamine.

If 2 moles of the metal alkoxide are used for every mole of an N-(hydroxyalkyl)piperazine-2,3-dione and subsequently 2 moles of halide are added, a Williamson ether synthesis can occur which will change the nature of the original radical R as well as introduce a substituent on the second nitrogen atom. In Example 3, N-(2-hydroxyethyl)piperazine-2,3-dione is treated with 2 molar equivalents of potassium tert-butoxide and the salt obtained is reacted with 2 molar equivalents of 5-bromo-1-pentene to give N-[2(4-pentenyloxy)ethyl]-N'-(4-pentenyl)piperazine-2,3-dione

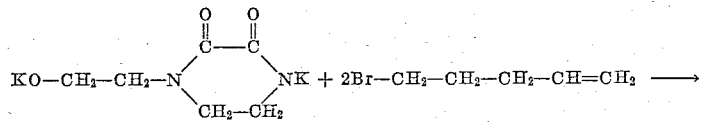

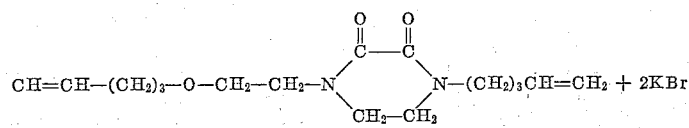

The hydrolysis of N,N'-diphenylpiperazine-2,3-dione to N,N'-diphenylethylenediamine has been disclosed by Bischoff and Nastvogel [Ber., 23, 2027 (1890)] who used alcoholic potassium hydroxide as the hydrolyzing reagent.

The reaction is carried out by adding the N,N'-dialkyl-piperazine-2,3-dione to an aqueous-ethanolic solution containing 2 molar equivalents of 85% potassium hydroxide. An antioxidant such as 2,6-di-t-butyl-p-cresol (about 0.12% by weight of the piperazine) is present. The mixture is refluxed for about 8–16 hours under a nitrogen atmosphere. After the mixture has cooled, solid potassium oxalate monohydrate precipitates and is separated. Concentration of the filtrate yields the product diamine which is fractionally distilled to purify it from traces of water and potassium oxalate monohydrate.

The hydrolysis may be carried out in propanol-1, methanol and ethylene glycol. Sodium hydroxide and lithium hydroxide may be used as basic reagents for the hydrolysis. The temperature required is not critical but it should be about 70° C. or higher to obtain complete reaction within a convenient time interval.

The compounds prepared by the subject invention may be used to prepare polyurethane elastomers, films, coatings and fibers. In general, a bis(chloroformate) is reacted with about a molar equivalent of representative subject diamine in the presence of an acid acceptor

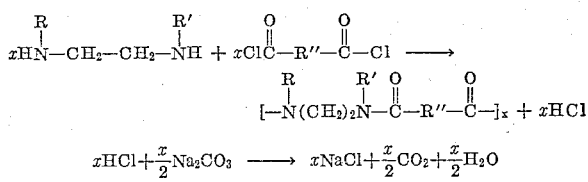

Since R and R' may contain hydroxyl substitution and ethylenic unsaturation, the polyurethane obtained may have sites for curing by diisocyanates or sulfur or both. This is an additional attractive feature of the diamine compounds made by the subject process.

In order to attain as high a molecular weight as possible, the diamine and the bis(chloroformate) should be reacted in approximately equimolar amounts. Mixtures of diamines may be employed with a single bis(chloroformate); mixtures of bis(chloroformates) may be used with a single diamine; mixtures of diamines may be reacted with mixtures of bis(chloroformates). The spacing of the crosslinking sites can be governed by the molar proportions of diamines used containing ethylenic unsaturation or hydroxyl groups relative to the other polymer components. Example 1 illustrates the preparation of an elastomer from N(2-hydroxyethyl)-N'(4-pentenyl) ethylenediamine and the bis(chloroformate) of a polytetramethyleneether glycol.

The bis(chloroformates) useful for elastomer preparation have the general formula

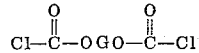

where OGO is the residue obtained by removing the terminal hydrogen atoms from a polyalkyleneether glycol, a polyesterglycol, polyaliphatic hydrocarbon diol. The molecular weight of these polymeric glycols may range from about 750–10000; 750–4000 is a preferred value for many elastomer applications. The polyalkyleneether glycols have the general formula $H(OR'')_nOH$ where R″ is an alkylene radical containing up to 10 carbon atoms; R″ need not be the same throughout the polymer chain. Representative examples of the polyalkyleneether glycols are: polypropyleneether glycol (M.W.=1025); polytetramethyleneether glycol (M.W.= 3000); ethylene oxide modified polypropyleneether glycol (commercially available from the Wyandotte Chemicals Co. as "Pluronic" 61), and polyethyleneether glycol (M.W.=800).

Another useful class of glycols are the polyalkylenearyleneether glycols. These glycols are similar to the polyalkyleneether glycols except that some arylene radicals are present. The phenylene, naphthylene and anthracene radicals may be used with or without substituents such as alkyl or alkylene groups, and, in general, there should be at least one polyalkyleneether radical having a molecular weight of about 500 for each arylene radical which is present.

The polyaliphatic hydrocarbon diols may contain saturation or unsaturation in their aliphatic portion. In general, the unsaturated compounds are preferred if the polymeric diamine is to be employed as an elastomer intermediate. The unsaturated diols may be prepared by reducing the ester-terminated polymer obtained by polymerizing appropriate free radical-polymerizable ethylenically unsaturated monomers, at least 50% of which are conjugated dienes, with an aliphatic azo dicarboxylate catalyst. The use of the azo catalyst is disclosed in U.S.P. 2,561,068, issued July 17, 1951, and in U.S.P. 2,877,212, issued March 10, 1959.

The bis(chloroformates) are prepared by adding the appropriate polymeric glycol to liquid phosgene at about 0 to 10° C. Alternatively the phosgene may be added to the polyether glycol dissolved in an inert solvent.

When the high polymers made by reacting bis(chloroformates) with the diamines of the present invention have side chains containing aliphatic C=C groups curing may be effected by utilizing sulfur in the presence of appropriate accelerators. Curing at a temperature of about 125 to 160° C. for one-half to several hours is generally sufficient. It is to be understood that various modifications of the sulfur cure may be employed depending upon the type of polyurethane used. Various procedures and modifications of sulfur curing are more particularly described in Encyclopedia of Chemical Technology, Kirk and Orthmer, published by the Interscience Encyclopedia, Inc., New York, vol. 11, pages 892-927; Principles of High Polymer Theory and Practice, Schmidt and Marlies, published by the McGraw-Hill Book Company, Inc., New York, 1948, pages 556-566; Chemistry and Technology of Rubber, Davis and Blake, published by the Reinhold Publishing Corp., New York, 1937, vol. 74, Chapter VI; a preferred curing method comprises incorporating, for each 100 parts of polymer (a) from 0.5 to 2.0 parts of sulfur, (b) from 2.0 to 4.0 parts of 2,2′-dithiobisbenzothiazole, and (c) from 0.05 to 0.5 part of zinc chloride (or zinc bromide or zinc iodide), and heating the polymer at about 150° C. so as to effect a cure.

The smear point value is the temperature at which a trail of molten polymer is left on a copper block when a sample is drawn slowly over the surface under firm pressure. The polyurethane elastomers which contain unsubstituted nitrogen atoms in the polymer chain have smear points of less than 250° C. In Example 1 of the present application, the sulfur-cured polyurethane elastomer prepared from N-(2-hydroxyethyl)-N′-4-pentenyl-ethylenediamine has a smear point of 320° C. This is an outstanding improvement.

Representative examples illustrating the present invention follow.

EXAMPLE 1

*Preparation of N-(2-Hydroxyethyl)-N′-Pentenyl-Ethylenediamine*

(A) PREPARATION OF THE PIPERAZINE-2,3-DIONE

A mixture of 343 parts (3.30 moles) of N-(2-hydroxyethyl)-ethylenediamine and 5 parts of concentrated hydrochloric acid is added to 389 parts (3.30 moles) of dimethyl oxalate over a period of 15 minutes with good agitation. The temperature of the mass is gradually raised to 218° C. in about one hour. Below about 180° C. the mass increases in viscosity as the temperature increases; above about 180° C. the mass decreases markedly in viscosity as the temperature is elevated. During this hour period 206 parts (6.64 moles, 97.6% of theory) of methanol distills from the reaction mixture. The mass is subsequently cooled to room temperature, taken up in 320 parts of ethanol, cooled, and filtered. The product after further crystallization from ethanol melts at 163-164° C.

*Analysis.*—Calc. for $C_6H_{10}N_2O_3$: C, 45.56; H, 6.37; N, 17.72. Found: C, 45.35; H, 6.00; N, 17.50.

(B) ALKYLATION OF THE PIPERAZINE-2,3-DIONE

A dry reaction vessel is used which is equipped with an agitator, thermometer, and reflux condenser fitted with a drying tube containing anhydrous calcium sulfate. To this vessel are added, in turn, 1260 parts of tertiary butyl alcohol and 61.4 parts (1.57 moles) of potassium metal. The mixture is agitated at reflux until the metal has completely reacted. N-(2-hydroxyethyl)piperazine-2,3-dione (248 parts, 1.57 moles) is added, and the agitated suspension is refluxed for 16 hours. The temperature is lowered to 70° C., 234 parts (1.57 moles) of 5-bromo-1-pentene is introduced, and the mixture is agitated at reflux for 16 hours. After the mass has been cooled, the solid potassium bromide (160 parts, 86% of theory) is separated and the alcoholic filtrate is concentrated by distillation. The last traces of solvent are taken off under reduced pressure.

The viscous residue obtained is extracted with benzene (one 440-part and three 220-part portions) and then with tetrahydrofuran (three 440-part, eight 220-part, and six 90-part portions). The tetrahydrofuran solvent is then distilled off. The solid obtained is recrystallized from tetrahydrofuran to give 127 parts of product. The filtrate is diluted with 1775 parts of tetrahydrofuran and the supernatant liquid is decanted from the oil which separates. The solution is concentrated, seeded, and another 64.5 parts of solid is collected. The residue concentrated from the benzene extract and the final tetrahydrofuran filtrate from the recrystallization is chromatographed on 200 mesh activated alumina with tetrahydrofuran and ethanol. An additional 56.5 part of product is obtained. The total yield is 248 parts (70% of theory). Recrystallization of the combined solid from tetrahydrofuran affords pure N-(2-hydroxyethyl)-N′-(4-pentenyl)-piperazine-2,3-dione, M.P. 75-76.5° C.

*Analysis.*—Calcd. for $C_{11}H_{18}N_2O_3$: C, 58.39; H, 8.02; N, 12.38. Found: C, 58.50; H, 7.85; N, 12.60.

(C) HYDROLYSIS OF THE ALKYLATED PIPERAZINE-2,3-DIONE

To a solution of 50 parts (0.770 mole) of 85% potassium hydroxide in 450 parts of ethanol is added 0.1 part of 2,6-di-tert-butyl-p-cresol, a solution of 0.1 part of sodium sulfite in 25 parts of water, and 83 parts (0.376 mole) of N-(2-hydroxyethyl)-N′-(4-pentenyl)piperazine-2,3-dione. The clear solution is refluxed 16 hours under an atmosphere of nitrogen; a precipitate begins to form after about 15 minutes. The mixture obtained is cooled and the solid potassium oxalate monohydrate is filtered (65.5 parts, 96.8% of theory). Concentration of the filtrate yields 57.6 parts (91.5% of theory) of N-(2-hydroxyethyl)-N′-(4-pentenyl)ethylenediamine, B.P. 97.5° C. (0.15 mm. Hg), $n_D^{25}$ 1.4772.

*Analysis.*—Calcd. for $C_9H_{20}N_2O$: C, 62.75; H, 11.70; N, 16.27; primary amine N, nil. Found: C, 62.65; H, 11.45; N, 16.10; primary amino N, nil.

A drop of amine added to aqueous oxalic acid yielded the bis oxalate M.P. 236.7° C.

*Analysis.*—Calcd. for $C_{13}H_{24}N_2O_9$: C, 44.31; H, 6.87; N, 7.95. Found: C, 44.10; H, 6.85; N, 7.80.

(D) POLYURETHANE PREPARATION

To a solution of 50 parts (0.0415 mole) of polytetramethyleneether bis(chloroformate) [M.W.=1205] in 440 parts of anhydrous chloroform in a Waring blendor is added a solution of 7.35 parts (0.0427) of N-(2-hydroxyethyl)-N'-(4-pentenyl)ethylenediamine and 9.52 parts (0.0898 mole) of sodium carbonate in 120 parts of water. The mixture is stirred at full speed for 10 minutes, 0.5 part of 2,6-di-tert-butyl-p-cresol is added, and stirring is continued slowly for another two minutes. The viscous emulsion is then poured into boiling water to remove the chloroform. The polymer obtained is washed with water at 40–50° C. on a corrugated mill and dried at 110° C. on a smooth mill. The intrinsic viscosity of the polymer in a mixture of tetrahydrofuran and dimethyl formamide at 25° C. is 1.36. The polymer has one sulfur cure site and one diisocyanate cure site for every 1300 molecular weight.

(E) COMPOUNDING AND CURING THE ELASTOMER

The polymer is milled for 10 minutes at 100–110° C. to insure dryness. Compounding is carried out at 30° C. Into one portion of the stock is milled 3,3'-dimethoxybiphenyl-4,4'-diisocyanate. Into another portion of the stock is milled (per 100 parts of elastomer): 1 part sulfur, 4 parts 2,2'-dithiobisbenzothiozole, 2 parts mercaptobenzothiozole, 0.7 part of a 1:1 molar complex of zinc chloride and 2,2'-dithiobisbenzothiozole, and 1.0 part of cadmium stearate. Both samples are cured at 150° C. for 4 hours. The smear point of both elastomers is 320° C.

EXAMPLE 2

*Preparation of N-(2-hydroxyethyl)-N'-n-Butylethylenediamine*

(A) PREPARATION OF THE PIPERAZINE-2,3-DIONE

The preparation of N-(2-hydroxyethyl)piperazine-2,3-dione is carried out by the procedure given in Part A of Example 1.

(B) ALKYLATION OF THE HYDROXYETHYLPIPERAZINEDIONE

A dry reaction vessel is used which is equipped with an agitator, thermometer, and reflux condenser fitted with a drying tube containing anhydrous calcium sulfate. 10.1 parts (0.258 mole) of potassium metal is added to 300 parts of tert-butanol in this reactor and the mixture obtained is agitated at reflux until the metal has completely dissolved. 40.7 parts (0.258 mole) of N-(2-hydroxyethyl)piperazine-2,3-dione is added and the agitated suspension is refluxed for several hours. A heavy white precipitate forms. Then 35.4 parts (0.258 mole) of n-butyl bromide is introduced and the mixture is agitated at reflux for 16 hours. After the mass has been cooled, 28 parts (91% of theory) of solid potassium bromide is separated by filtration. The filtrate is concentrated under reduced pressure.

When all the tert-butanol has been distilled off, the residue is extracted, in turn, by 440 parts of benzene and 440 parts of tetrahydrofuran. A chromatography column is prepared by slurrying 200 mesh activated alumina in benzene and adding the slurry to the empty column. 5 parts of ethyl acetate is added to the top of the column (to deactivate the column toward hydrolysis) and eluted with 90 parts of tetrahydrofuran. The tetrahydrofuran extract is added to the column which is subsequently developed by the addition of 440 parts of tetrahydrofuran, and the following mixtures.

| Parts of tetrahydrofuran: | Parts of ethanol |
|---|---|
| 420 | 20 |
| 400 | 39 |
| 375 | 59 |
| 65 | 59 |
| 220 | 195 |
| 0 | 390 |
| 0 | 390 |

The last addition contains 315 parts of ethanol and 100 parts of water. Fractions are taken off the bottom of the column. They are subsequently freed from solvent by concentration under vacuum. The first fractions yield only traces of oil which are discarded. After about 1400 parts of solution has been collected, the product appears. It occasionally is obtained for several fractions as an oil which, however, may be induced to crystallize by addition of crystals obtained from later fractions which spontaneously crystallize. The crystals are separated and finally recrystallized from tetrahydrofuran. 7 parts of product is obtained wihch melts 93.5–94° C.

*Analysis.*—Calcd. for $C_{10}H_{18}N_2O_3$: C, 56.07; H, 8.41; N, 13.08. Found: C, 56.15; H, 8.40; N, 13.10.

(C) HYDROLYSIS OF THE ALKYLATED PIPERAZINE-2,3-DIONE

To a solution of 4.06 part (0.0615 mole) of 85% potassium hydroxide in 40 parts of ethanol is added a solution of 0.1 part sodium sulfite in 10 parts of water and 6.27 parts (0.0293 mole) of N-(2-hydroxyethyl)-N'-butylpiperazine-2,3-dione. The reactants are agitated at reflux for 16 hours. The mixture is cooled and 5.35 parts (99% of theory) of precipitated potassium oxalate monohydrate is collected. Concentration of the filtrate yields 3.64 parts (77% of theory) of N-(2-hydroxyethyl-N'-butylethylenediamine, B.P. 92° C. (0.35 mm. Hg).

*Analysis.*—Calcd. for $C_8H_{20}N_2O$: C, 59.95; H, 12.58; N, 17.48. Found: C, 60.67; H, 12.57; N, 17.20.

A drop of amine is added to aqueous oxalic acid to prepare the bis(oxalate) M.P. 238–239.5° C.

*Analysis.*—Calcd. for $C_{12}H_{24}N_2O_9$: C, 42.35; H, 7.11; N, 8.23. Found: C, 42.15; H, 6.90; N, 8.10.

EXAMPLE 3

*Preparation of N-[2-(4-Pentenyloxy)Ethyl]-N'-(4-Pentyl)-Ethylenediamine*

(A) PREPARATION OF THE PIPERAZINE-2,3-DIONE

N-(2-hydroxyethyl)-piperazine-2,3-dione is prepared by the procedure given in Part A of Example 1.

(B) PREPARATION OF N-[2-(4-PENTENYLOXY)ETHYL]-N'-(4-PENTENYL)-PIPERAZINE-2,3-DIONE

A dry reaction vessel is used which is equipped with an agitator, thermometer, and reflux condenser fitted with a drying tube containing anhydrous calcium sulfate. To this vessel are added, in turn, 1250 parts of tertiary butyl alcohol and 122.8 parts (3.14 moles) of potassium. The mixture is agitated at reflux until the metal has completely reacted. 248 parts (1.57 moles) of N-(2-hydroxyethyl)-piperazine-2,3-dione is added and the agitated suspension is refluxed for 16 hours. The temperature is lowered to 70° C., 468 parts (3.14 moles) of 5-bromo-1-pentene is introduced, and the mixture is agitated at reflux for 16 hours. After the mass has been cooled, 312 parts (82% of theory) solid potassium bromide is separated and the filtrate is concentrated.

The viscous residue obtained is extracted with benzene. The benzene extract is then concentrated and taken up in tetrahydrofuran. This solution is chromatographed using a column packed with activated alumina. The eluate is concentrated and the residue is distilled at 240° C. (0.5 mm. Hg). The oil obtained has a $n_D^{25}$ value of 1.5010.

*Analysis.*—Calcd. for $C_{16}H_{22}N_2O_3$: C, 65.30; H, 8.89; N, 9.55. Found: C, 64.85; H, 8.85; N, 9.45.

(C) HYDROLYSIS OF THE ALKYLATED PIPERAZINE-2,3-DIONE

To a solution of 11 parts (0.166 mole) of 85% potassium hydroxide in 40 parts of ethanol is added 0.1 part of sodium sulfite in 5 parts of water, 0.1 part of 2,6-di-tert-butyl-p-cresol, and 23.28 (0.0791 mole) parts of N-[2 - (4 - pentenyloxy)ethyl]-N'-(4-pentenyl)piperazine-2,3-dione. The mixture is refluxed for 16 hours under a nitrogen atmosphere. The mixture obtained is cooled, the precipitated potassium oxalate monohydrate is filtered off and washed with 16 parts of ethanol. The washings and the filtrate are combined and the alcohol is removed by distillation at atmospheric pressure. The residue obtained is fractionally distilled under reduced pressure. 9.7 parts B.P. 106–108° C. (0.35 mm.) and 3.3 parts B.P. 108–120° C. (0.35 mm.) are collected (yield 68.5% of theory).

*Analysis.*—Calcd. for $C_{14}H_{28}N_2O$: C, 69.95; H, 11.74; N, 11.65; primary $NH_2$, nil. Found: C, 70.10; H, 11.50; N, 11.60; primary $NH_2$, nil.

EXAMPLE 4

*Preparation of N-(2-Hydroxyethyl)-N'-(3-Chloropropyl)Ethylenediamine*

(A) PREPARATION OF THE N-ALKYLATED PIPERAZINE 2,3-DIONE

N-(2-hydroxyethyl)-piperazine-2,3-dione is prepared by the procedure given in Part A of Example 1.

(B) N'-ALKYLATION OF THE N-ALKYLATED PIPERAZINE-2,3-DIONE

A dry reaction flask is used which is equipped with an agitator, thermometer, and reflux condenser fitted with a drying tube containing anhydrous calcium sulfate. To this vessel are added, in turn, 545 parts of tert-butanol and 24.9 parts (0.637 mole) of potassium. The mixture is agitated until the potassium has completely reacted. Then 100 parts (0.633 mole) of N-(2-hydroxyethyl)piperazine-2,3-dione is added, and the agitated suspension is refluxed for 16 hours. The mixture is then cooled, 150 parts (0.953 mole) of 1-bromo-3-chloropropane is introduced and the mixture is agitated at reflux for 8 hours. After the mass has been cooled, the precipitated potassium bromide is separated, and the filtrate is concentrated at reduced pressure to give 85 parts of solid.

This residue is dissolved in 110 parts of ethanol and 355 parts of tetrahydrofuran is added. The solution is chromatographed on 200 mesh activated alumina. A mixture of 74 parts tetrahydrofuran to 26 parts ethanol is used to elute the product. Each 250-ml. fraction removed from the base of the column is concentrated. The first 5 fractions give about 37 parts of an oil. The subsequent fractions yield 22.2 parts of residue which crystallizes. These crystals are soluble in alcohol but not in tetrahydrofuran.

*Analysis.*—Calcd. for $C_9H_{15}N_2O_3Cl \cdot \frac{1}{2}H_2O$: C, 44.35; H, 6.55; N, 11.50; Cl, 14.58. Found: C, 44.15; H, 6.25; N, 11.75; Cl, 14.93.

(C) HYDROLYSIS OF THE ALKYLATED PIPERAZINE-2,3-DIONE

The hydrolysis of N-(2-hydroxyethyl)-N'-(3-chloropropyl)piperazine-2,3-dione to N-(2-hydroxyethyl)-N'-(3-chloropropyl)ethylenediamine is carried out by the procedure described in Part C of Example 1.

As many apparently widely different embodiments of this invention may be made without departing from the spirit and scope thereof, it is to be understood that this invention is not limited to the specific embodiments thereof except as defined in the appended claims.

This application is a continuation-in-part of copending application Serial No. 664,155, filed June 7, 1957, now U.S. Patent 2,913,496.

The embodiments of the invention in which an exclusive property or privilege is claimed are defined as follows:

A process for preparing unsymmetrical N,N'-disubstituted ethylenediamines of the formula

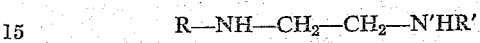

R—NH—CH$_2$—CH$_2$—N'HR' wherein R and R' are independently selected from the group consisting of alkyl and alkenyl groups of from 1 to 18 carbon atoms and such alkyl and alkenyl groups substituted by a radical selected from the group consisting of alkoxyl having no more than six carbon atoms, alkenoxyl having no more than six carbon atoms, phenoxyl, phenyl, hydroxyl, carboxyl, mercapto, and halogen;

which process comprises: (1) heating a mono-N-substituted ethylenediamine of the formula

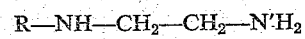

R—NH—CH$_2$—CH$_2$—N'H$_2$ wherein R is as defined above, with approximately equimolar amounts of a di-lower alkyl oxalate at 180° C.–220° C. until alcohol evolution has ceased thereby forming a mono-N-substituted piperazine-2,3-dione; (2) reacting, with agitation, said mono-N-substituted piperazine-2,3-dione with approximately equimolar amounts of an alkali metal base selected from the group consisting of Group IA metal alkoxides and Group IA metal hydrides in a solvent selected from the group consisting of 1,4-dioxane, di-n-butyl ether, t-butanol, dimethylethylcarbinol, and diethylisopropylcarbinol, to form a salt at the N'-position of said mono-N-substituted piperazine-2,3-dione; (3) reacting, with agitation, said salt with at least a molar equivalent of a halide selected from the group consisting of R'-bromides, R'-chlorides, 2-bromoethylthioacetate and ethyl bromoacetate, wherein R' is as defined above, in a solvent as defined above, thereby forming an unsymmetrical N,N'-disubstituted piperazine-2,3-dione; and (4) heating said N,N'-disubstituted piperazine dione at a temperature of at least 70° C. with an aqueous alcoholic solution of an alkali metal hydroxide, followed by cooling, filtering and concentrating the filtrate to obtain the unsymmetrical N,N'-disubstituted ethylenediamine.

References Cited in the file of this patent

UNITED STATES PATENTS 2,913,496   Cluff _____ Nov. 17, 1959

OTHER REFERENCES

Bischoff et al.: Ber., volume 23, pages 2026–30 (1890).
Blacher: Ber., volume 28, pages 432–437 (1895).
Fones: J. Org. Chem., volume 14, pages 1099–1102 (1949).
Riebsomer: J. Org. Chem., volume 15, pages 68–73 (1950).